United States Patent
Hara et al.

(10) Patent No.: US 8,557,939 B2
(45) Date of Patent: Oct. 15, 2013

(54) ANTIFOULING COMPOSITION, METHOD FOR ITS PRODUCTION AND ARTICLE TREATED THEREWITH

(75) Inventors: Hiroyuki Hara, Tokyo (JP); Shuichiro Sugimoto, Tokyo (JP); Takao Hirono, Tokyo (JP); Takashige Maekawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 350 days.

(21) Appl. No.: 12/622,949

(22) Filed: Nov. 20, 2009

(65) Prior Publication Data
US 2010/0069565 A1 Mar. 18, 2010

Related U.S. Application Data

(63) Continuation of application No. PCT/JP2008/059379, filed on May 21, 2008.

(30) Foreign Application Priority Data

May 22, 2007 (JP) .................. 2007-135412

(51) Int. Cl.
*C08F 18/20* (2006.01)
(52) U.S. Cl.
USPC ........... 526/245; 526/242; 526/246; 526/247; 526/253; 526/254; 526/255; 526/312; 526/320
(58) Field of Classification Search
USPC ......... 526/242, 245, 247
See application file for complete search history.

(56) References Cited

U.S. PATENT DOCUMENTS

| | | | | |
|---|---|---|---|---|
| 3,944,527 A * | 3/1976 | McCown | ...................... | 526/243 |
| 3,950,298 A * | 4/1976 | McCown et al. | ............. | 524/544 |
| 4,859,754 A * | 8/1989 | Maekawa et al. | ............. | 526/245 |
| 6,207,777 B1 * | 3/2001 | Shimada et al. | ............. | 526/245 |
| 6,271,283 B1 * | 8/2001 | Shimada et al. | ............. | 523/122 |
| 6,610,775 B1 * | 8/2003 | Oharu et al. | ................... | 524/507 |
| 2007/0015867 A1 * | 1/2007 | Maekawa et al. | ............. | 524/544 |
| 2008/0280808 A1 * | 11/2008 | Yamaguchi et al. | .......... | 510/528 |

FOREIGN PATENT DOCUMENTS

| | | |
|---|---|---|
| JP | 3320491 | 6/2002 |
| JP | 3820694 | 6/2006 |
| WO | WO 00/43462 | 7/2000 |
| WO | WO 2005/090423 A1 | 9/2005 |
| WO | WO2005097851 | 10/2005 |

* cited by examiner

*Primary Examiner* — Nicole M Buie-Hatcher
(74) *Attorney, Agent, or Firm* — Oblon, Spivak, McClelland, Maier & Neustadt, L.L.P.

(57) ABSTRACT

To provide an antifouling composition which is a fluorine-type antifouling composition using a short chain perfluoroalkyl group and which is excellent in antifouling properties and water/oil repellency and presents good durability against washing. An antifouling composition comprising a fluorocopolymer which comprises from 30 to 65 mass % of polymerized units (a) having a C1-6 perfluoroalkyl group, from 1 to 67 mass % of polymerized units (b1) having $—(C_2H_4O)—$ and from 3 to 34 mass % of polymerized units (b2) having $—(C_4H_8O)—$, wherein the content of $—(C_2H_4O)—$ is from 20 to 65 mass %, and the content of $—(C_4H_8O)—$ is from 2 to 13 mass %.

19 Claims, No Drawings

ANTIFOULING COMPOSITION, METHOD FOR ITS PRODUCTION AND ARTICLE TREATED THEREWITH

TECHNICAL FIELD

The present invention relates to an antifouling composition, a method for its production and an article treated with the antifouling composition.

BACKGROUND ART

Heretofore, as treating agents for water/oil repellent treatment or antifouling treatment of clothing, various compositions have been provided depending upon the particular purposes. For work wears such as work clothes, linen such as rental sheets, etc., it has been common to employ a fluorine type SR (soil release) agent which has both water/oil repellency to prevent soiling and SR (soil release) properties whereby any soil attached may readily be removed by cleaning or washing.

For example, there have been proposed a fluorine type antifouling agent containing, as an effective component, a copolymer of a (meth)acrylate containing a polyfluoroalkyl group, a (meth)acrylate containing a polyoxyalkylene chain and a (meth)acrylate containing a blocked isocyanate group (the following Patent Document 1), a fluorine type antifouling agent containing, as an effective component, a copolymer of a (meth)acrylate containing a polyfluoroalkyl group, a (meth)acrylate containing a polyoxyalkylene chain and a (meth)acrylate containing an acetoacetyl group (the following Patent Document 2), etc.

With respect to these treating agents, it has been proposed to use a (meth)acrylate containing an ethylene oxide chain and a propylene oxide chain in the same side chain, as the (meth)acrylate containing an oxyalkylene chain, or to use two components of a (meth)acrylate containing an ethylene oxide chain and a (meth)acrylate containing a propylene oxide chain in combination, whereby better water/oil repellency and antifouling performance can be provided.

However, the polyfluoroalkyl group used in these treating agents mainly has at least 8 carbon atoms. In recent years, from the viewpoint of the influence to the environment, it has been recommended for a compound having a perfluoroalkyl group to have less than 8 carbon atoms in the perfluoroalkyl group.

In the following Patent Document 3, a soil release agent is proposed which contains, as an effective component, a copolymer of a (meth)acrylate containing a perfluoroalkyl group having less than 8 carbon atoms, a (meth)acrylate containing a polyethylene oxide chain and a (meth)acrylate containing a polypropylene oxide chain.

Patent Document 1: Japanese Patent No. 3,320,491
Patent Document 2: Japanese Patent No. 3,820,694
Patent Document 3: WO2005/097851

DISCLOSURE OF THE INVENTION

Problem to be Solved by the Invention

However, the soil release agent disclosed in Patent Document 3 has a problem that the durability against washing is not sufficient so that the performance tends to be low as washing is repeated.

For a fluorine type antifouling agent employing a short chain perfluoroalkyl group having less than 8 carbon atoms, it is necessary to compensate a decrease in the performance due to shortening of the chain of the perfluoroalkyl group with another component, but it is difficult to satisfy the antifouling property, water/oil repellency and durability against washing at the same time.

The present invention has been made under such circumstances and has an object to provide an antifouling composition which is a fluorine type antifouling composition employing a short chain perfluoroalkyl group and which is excellent in the antifouling property and water/oil repellency and at the same time presents good durability against washing, a method for its production, and an article treated with such an antifouling composition.

Means to Solve the Problem

In order to solve the above problem, the antifouling composition of the present invention comprises a fluorocopolymer which comprises from 30 to 65 mass % of polymerized units (a) based on the following monomer (a), from 1 to 67 mass % of polymerized units (b1) based on the following monomer (b1) and from 3 to 34 mass % of polymerized units (b2) based on the following monomer (b2), wherein the content of —$(C_2H_4O)$— is from 20 to 65 mass %, and the content of —$(C_4H_8O)$— is from 2 to 13 mass %:

Monomer (a): a compound represented by $(Z-Y)_nX$, wherein Z is a $C_{1-6}$ perfluoroalkyl group or a monovalent group represented by $C_mF_{2m+1}O(CFWCF_2O)_dCFK$— (wherein m is an integer of from 1 to 6, d is an integer of from 0 to 4, and each of W and K which are independent of each other, is a fluorine atom or a trifluoromethyl group), Y is a bivalent organic group or a single bond, n is 1 or 2, when n is 1, X is —$CR=CH_2$, —$COOCR=CH_2$, —$OCOCR=CH_2$, —$OCH_2$-ϕ-$CR=CH_2$ or —$OCH=CH_2$, and when n is 2, X is —$CH[-(CH_2)_pCR=CH_2]$—, —$CH[-(CH_2)_pCOOCR=CH_2]$—, —$CH[-(CH_2)_pOCOCR=CH_2]$— or —$OCOCH=CHCOO$—, R is a hydrogen atom, a methyl group or a halogen atom, ϕ is a phenylene group, and p is an integer of from 0 to 4, Monomer (b1): a compound represented by $CH_2=CR^1-G^1-(C_2H_4O)_{q1}-R^2$, Monomer (b2): a compound represented by $CH_2=CR^3-G^2-(C_2H_4O)_{q2}-(C_4H_8O)_{q3}-R^4$, wherein each of $R^1$, $R^2$, $R^3$ and $R^4$ which are independent of one another, is a hydrogen atom or a methyl group, each of q1 and q3 which are independent of each other, is an integer of from 1 to 50, q2 is an integer of from 0 to 50, each of $G^1$ and $G^2$ which are independent of each other, is —$COO(CH_2)_r$ or —$COO(CH_2)_t$—NHCOO— (wherein r is an integer of from 0 to 4, and t is an integer of from 1 to 4).

Further, the present invention provides an article treated with the antifouling composition of the present invention.

Further, the method for producing the antifouling composition of the present invention comprises a step of polymerizing a monomer mixture comprising from 30 to 65 mass % of the above monomer (a), from 1 to 67 mass % of the above monomer (b1) and from 3 to 34 mass % of the above monomer (b2), wherein the content of —$(C_2H_4O)$— is from 20 to 65 mass %, and the content of —$(C_4H_8O)$— is from 2 to 13 mass %, in the presence of a polymerization initiator in a medium.

Effect of the Invention

According to the present invention, it is possible to obtain an antifouling composition which comprises, as an effective component, a fluorocopolymer having a $C_{1-6}$ perfluoroalkyl group and which is excellent in the antifouling property and water/oil repellency and which, at the same time, presents good durability against washing, and an article treated with such an antifouling composition.

BEST MODE FOR CARRYING OUT THE INVENTION

The fluorocopolymer contained in the antifouling composition of the present invention comprises at least polymerized units (a) based on the monomer (a), polymerized units (b1) based on the monomer (b1) and polymerized units (b2) based on the monomer (b2). Further, it may contain polymerized units (c) based on the monomer (c) and/or polymerized units (d) based on the monomer (d).

<Monomer (a)>

The polymerized units (a) are polymerized units formed by cleavage of a double bond in a polymerizable unsaturated group in the monomer (a).

The monomer (a) is a compound represented by $(Z-Y)_nX$.

Z in $(Z-Y)_nX$ is a $C_{1-6}$ perfluoroalkyl group or a group represented by $C_mF_{2m+1}O(CFWCF_2O)_dCFK-$ (wherein m is an integer of from 1 to 6, d is an integer of from 0 to 4, and each of W and K which are independent of each other, is a fluorine atom or a trifluoromethyl group ($-CF_3$)).

Z is preferably a $C_{1-6}$ perfluoroalkyl group, more preferably $F(CF_2)_2-$, $F(CF_2)_3-$, $F(CF_2)_4-$, $F(CF_2)_5-$, $F(CF_2)_6-$ or $(CF_3)_2CF(CF_2)_2-$, most preferably $F(CF_2)_4-$, $F(CF_2)_5-$ or $F(CF_2)_6-$.

Y is a bivalent organic group or a single bond. Y is preferably a bivalent organic group.

Y is more preferably a bivalent group represented by $-R^M-T-R^N-$, wherein each of $R^M$ and $R^N$ which are independent of each other, is a single bond or a $C_{1-22}$ saturated or unsaturated bivalent hydrocarbon group which may contain at least one etheric oxygen atom, and T is a single bond, $-COO-$, $-OCONH-$, $-CONH-$, $-SO_2NH-$, $-SO_2NR'-$ (wherein R' is a $C_{1-6}$ alkyl group) or $-NHCONH-$.

Y is preferably a $C_{1-10}$ alkylene group, $-CH=CHCH_2-$, $-(CH_2CHR''O)_jCH_2CH_2-$ (wherein j is an integer of from 1 to 10, and R'' is a hydrogen atom or a methyl group), $-C_2H_4OCONHC_2H_4-$, $-C_2H_4OCOOC_2H_4-$ or $-COOC_2H_4-$, more preferably a $C_{1-10}$ alkylene group, further preferably $-CH_2-$, $-CH_2CH_2-$, $-(CH_2)_{11}-$ or $-CH_2CH_2CH(CH_3)-$.

X is a polymerizable unsaturated group, and when n is 1, it is $-CR=CH_2$, $-CR=CH-CH=CH_2$, $-COOCR=CH_2$, $-OCOCR=CH_2$, $-OCH_2-\phi-CR=CH_2$ or $-OCH=CH_2$, and when n is 2, it is $-CH[-(CH_2)_pCR=CH_2]-$, $-CH[-(CH_2)_pCOOCR=CH_2]-$, $-CH[-CH_2]_pOCOCR=CH_2]-$ or $-OCOCH=CHCOO-$ (wherein R is a hydrogen atom, a methyl group or a halogen atom, $\phi$ is a phenylene group, and p is an integer of from 0 to 4).

X is preferably $-OCOCR=CH_2$ or $-OCOCH=CHCOO-$, more preferably $-OCOCR=CH_2$, whereby the solubility in a solvent will be excellent, and emulsion polymerization can be carried out easily. R is preferably a hydrogen atom, a halogen atom (such as a fluorine atom or a chlorine atom) or a $C_{1-3}$ alkylene group, more preferably a hydrogen atom, a methyl group or a halogen atom, whereby the polymerizability is excellent.

The monomer (a) is preferably 3,3,4,4,5,5,6,6,7,7,8,8,8-tridecafluorooctyl (meth)acrylate ($C_6F_{13}C_2H_4OCOCH=CH_2$ or $C_6F_{13}C_2H_4OCOC(CH_3)=CH_2$), 3,3,4,4,5,5,6,6,6-nonafluorohexyl (meth)acrylate ($C_4F_9C_2H_4OCOCH=CH_2$ or $C_4F_9C_2H_4OCOC(CH_3)=CH_2$), or 3,3,4,4,5,5,6,6,7,7,8,8,8-tridecafluorooctyl α-chloroacrylate ($C_6F_{13}C_2H_4OCOC(Cl)=CH_2$).

As the monomer (a), one type may be used alone or two or more types may be used in combination.

<Monomer (b1)>

The polymerized units (b1) are polymerized units formed by cleavage of an ethylenic double bond in the monomer (b1).

The monomer (b1) is a compound represented by $CH_2=CR^1-G^1-(EO)_{q1}-R^2$. In this specification, "EO" represents "$-C_2H_4O-$".

In the formula, each of $R^1$ and $R^2$ which are independent of each other, is a hydrogen atom or a methyl group, preferably a methyl group, q1 is an integer of from 1 to 50, preferably from 2 to 20, and $G^1$ is $-COO(CH_2)_r-$ or $-COO(CH_2)_t-NHCOO-$ (wherein r is an integer of from 0 to 4, and t is an integer of from 1 to 4), preferably $-COO(CH_2)_r-$ (wherein r is an integer of from 0 to 4).

The monomer (b1) is preferably polyethylene oxide monoacrylate ($CH_2=CHCOO(EO)_{q1}H$), polyethylene oxide monomethacrylate ($CH_2=C(CH_3)COO(EO)_{q1}H$), methoxypolyethylene oxide monoacrylate ($CH_2=CHCOO(EO)_{q1}CH_3$) or methoxypolyethylene oxide monomethacrylate ($CH_2=C(CH_3)COO(EO)_{q1}CH_3$), more preferably methoxypolyethylene oxide methacrylate.

As the monomer (b1), one type may be used alone, or two or more types may be used in combination.

<Monomer (b2)>

The polymerized units (b2) are polymerized units formed by cleavage of an ethylenic double bond in the monomer (b2).

The monomer (b2) is compound represented by $CH_2=CR^3-G^2-(EO)_{q2}-(TO)_{q3}-R^4$. In this specification, "TO" represents "$-C_4H_8O-$".

In the formula, each of $R^3$ and $R^4$ which are independent of each other, is a hydrogen atom or a methyl group. $R^3$ is preferably a methyl group, and $R^4$ is preferably a hydrogen atom. q2 is an integer of from 0 to 50, preferably from 2 to 20, and q3 is an integer of from 1 to 50, preferably from 2 to 20. $G^2$ is $-COO(CH_2)_r-$ or $-COO(CH_2)_t-NHCOO-$ (wherein r is an integer of from 0 to 4, and t is an integer of from 1 to 4), preferably $-COO(CH_2)_r-$ (wherein r is an integer of from 0 to 4).

In the monomer (b2), when q2 is at least 1, the copolymer chain of ethylene oxide (EO) and tetramethylene oxide (TO) may be a random copolymer chain or a block copolymer chain.

The monomer (b2), is preferably poly(ethylene oxide-tetramethylene oxide) monoacrylate ($CH_2=CHCOO-[(EO)_{q2}-(TO)_{q3}]-H$), poly(ethylene oxide-tetramethylene oxide) monomethacrylate ($CH_2=C(CH_3)COO-[(EO)_{q2}-(TO)_{q3}]-H$), methoxypoly(ethylene oxide-tetramethylene oxide) monoacrylate ($CH_2=CHCOO-[(EO)_{q2}-(TO)_{q3}]-CH_3$), methoxypoly(ethylene oxide-tetramethylene oxide) monomethacrylate ($CH_2=C(CH_3)COO-[(EO)_{q2}-(TO)_{q3}]-CH_3$), polytetramethylene oxide monoacrylate ($CH_2=CHCOO-(TO)_{q3}-H$), polytetramethylene oxide methacrylate ($CH_2=C(CH_3)COO-(TO)_{q3}-H$), methoxypolytetramethylene oxide monoacrylate ($CH_2=CHCOO-(TO)_{q3}-CH_3$), or methoxypolytetramethylene oxide monomethacrylate ($CH_2=C(CH_3)COO-(TO)_{q3}-CH_3$), more preferably poly(ethylene oxide-tetramethylene oxide) monomethacrylate.

As the monomer (b2), one type may be used alone, or two or more types may be used in combination.

<Monomer (c)>

The polymerized units (c) are polymerized units formed by cleavage of an ethylenic double bond in the monomer (c).

The monomer (c) is a compound represented by $CH_2=CR^5$-M-Q-$NR^6R^7$ or $CH_2=CR^5$-M-Q-N(O)$R^6R^7$.

In the formulae, $R^5$ is a hydrogen atom or a methyl group, M is —COO— (ester bond) or —CONH— (amide bond), Q is a $C_{2-4}$ alkylene group or a $C_{2-3}$ alkylene group having some or all of hydrogen atoms substituted by hydroxy groups, and each of $R^6$ and $R^7$ which are independent of each other, is a benzyl group, a $C_{1-8}$ alkyl group or a $C_{2-3}$ alkyl group having some of hydrogen atoms substituted by hydroxy groups. $R^6$, $R^7$ and the nitrogen atom may form a piperidino group or a pyrrolidinyl group, or $R^6$, $R^7$, the oxygen atom and the nitrogen atom may form a morpholino group.

M is preferably —COO— (ester bond), Q is preferably a $C_{2-4}$ alkylene group, and each of $R^6$ and $R^7$ is preferably a $C_{1-4}$ alkyl group.

The monomer (c) is preferably N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-diisopropylaminoethyl (meth)acrylate, N,N-dimethylaminopropyl (meth)acrylamide, N-(meth)acryloylmorpholine, N-(meth)acryloylpiperidine, N,N-dimethylaminooxideethyl (meth)acrylate, or N,N-diethylaminooxideethyl (meth)acrylate, more preferably N,N-dimethylaminoethyl methacrylate.

As the monomer (c), one type may be used alone, or two or more types may be used in combination.

<Monomer (d)>

The polymerized units (d) are polymerized units formed by cleavage of a double bond in a polymerizable unsaturated group in the monomer (d).

The monomer (d) is a monomer which is copolymerizable with the monomers (a), (b1) and (b2) and which has at least one crosslinkable functional group selected from the group consisting of an isocyanate group, a blocked isocyanate group, a urethane bond, an alkoxysilyl group, an epoxy group, an N-methylol group and an N-alkoxymethyl group and has no polyfluoroalkyl group. One which belongs to the monomer (b1) or (b2), does not belong to the monomer (d).

The monomer (d) is preferably a derivative of a (meth)acrylate or a derivative of a vinyl compound.

As the monomer (d), the following compounds may preferably be mentioned.

(1) Compound having an isocyanate group: 2-Isocyanateethyl (meth)acrylate, 3-isocyanatepropyl (meth)acrylate, or 4-isocyanatebutyl (meth)acrylate.

(2) Compound having a blocked isocyanate group: A 2-butanoneoxime adduct of 2-isocyanateethyl (meth)acrylate, a pyrazole adduct of 2-isocyanateethyl (meth)acrylate, a 3,5-dimethylpyrazole adduct of 2-isocyanateethyl (meth)acrylate, a 3-methylpyrazole adduct of 2-isocyanateethyl (meth)acrylate, an ϵ-caprolactam adduct of 2-isocyanateethyl (meth)acrylate, a 2-butanoneoxime adduct of 3-isocyanatepropyl (meth)acrylate, a pyrazole adduct of 3-isocyanatepropyl (meth)acrylate, a 3,5-dimethylpyrazole adduct of 3-isocyanatepropyl (meth)acrylate, a 3-methylpyrazole adduct of 3-isocyanatepropyl (meth)acrylate, an ϵ-caprolactam adduct of 3-isocyanatepropyl (meth)acrylate, a 2-butanoneoxime adduct of 4-isocyanatebutyl (meth)acrylate, a pyrazole adduct of 4-isocyanatebutyl (meth)acrylate, a 3,5-dimethylpyrazole adduct of 4-isocyanatebutyl (meth)acrylate, a 3-methylpyrazole adduct of 4-isocyanatebutyl (meth)acrylate, or an ϵ-caprolactam adduct of 4-isocyanatebutyl (meth)acrylate.

(3) Compound having a urethane bond: Triallyl isocyanurate, a tolylene diisocyanate adduct of 3-phenoxy-2-hydroxypropyl acrylate, a hexamethylene diisocyanate adduct of 3-phenoxy-2-hydroxypropyl acrylate, or a hexamethylene diisocyanate adduct of pentaerythritol triacrylate.

(4) Compound having an alkoxysilyl group: A compound represented by $CH_2=CR^8$-D-E-$SiR^aR^bR^c$ (wherein D is —OCO—, —COO— or a single bond, E is a $C_{1-4}$ alkylene group, each of $R^a$, $R^b$ and $R^c$ which are independent of one another, is a $C_{1-6}$ alkyl group or a $C_{1-6}$ alkoxy group, and $R^8$ is a hydrogen atom or a methyl group).

Specific examples include 3-methacryloyloxypropyl trimethoxysilane, 3-methacryloyloxypropyl dimethoxymethylsilane, 3-methacryloyloxypropyl triethoxysilane, 3-methacryloyloxypropyl ethoxyethylsilane, vinyl trimethoxysilane, etc.

(5) Compound having an epoxy group: Glycidyl (meth)acrylate, or a polyoxyalkylene glycol monoglycidyl ether (meth)acrylate.

(6) Compound having an N-methylol group or an N-alkoxymethyl group: N-methylol (meth)acrylamide, N-methylmethyl (meth)acrylamide, N-ethoxymethyl (meth)acrylamide or N-butoxymethyl (meth)acrylamide.

Among them, the polymer (d) is preferably the above (2) i.e. a compound having a blocked isocyanate group, particularly preferably a 3,5-dimethylpyrazole adduct of 2-isocyanateethyl (meth)acrylate.

As the monomer (d), one type may be used alone, or two or more types may be used in combination.

<Other Monomers>

In the present invention, the fluorocopolymer may further contain polymerized units based on monomers (which may be referred to as other monomers) which are copolymerizable with the monomers (a), (b1) and (b2) and which do not belong to any of the monomers (a) to (d), in order to improve the physical properties such as the adhesion or adhesive property of the fluorocopolymer to the substrate, durability against friction, etc.

Examples of such other monomers include ethylene, vinylidene chloride, vinyl chloride, vinylidene fluoride, vinyl acetate, vinyl propionate, vinyl isobutanoate, vinyl isodecanoate, vinyl stearate, cetyl vinyl ether, dodecyl vinyl ether, isobutyl vinyl ether, ethyl vinyl ether, 2-chloroethyl vinyl ether, styrene, α-methylstyrene, p-methylstyrene, (meth)acrylamide, N,N-dimethyl (meth)acrylamide, diacetone (meth)acrylamide, methylol-modified diacetone (meth)acrylamide, vinyl alkyl ketone, butadiene, isoprene, chloroprene, benzyl (meth)acrylate, a (meth)acrylate having a polysiloxane, allyl acetate, N-vinylcarbazole, maleimide, N-methylmaleimide, (meth)acrylic acid, 2-hydroxyethyl (meth)acrylate, 2-ethylhexyl (meth)acrylate, glycerol mono(meth)acrylate, hydroxypropyl (meth)acrylate, an adduct of 2-hydroxyethyl methacrylate and ϵ-caprolacton, polyethylene oxide di(meth)acrylate, polyethylene oxide-polypropylene oxide-polyethylene oxide di(meth)acrylate, propylene oxide diglycidyl ether di(meth)acrylate, tripropylene oxide diglycidyl ether di(meth)acrylate, glycerol diglycidyl ether di(meth)acrylate, etc.

Among them, preferred from the viewpoint of efficiency in improvement of the film forming property or durability of the antifouling composition, is vinylidene chloride, vinyl chloride, vinyl acetate, vinyl propionate, an adduct of 2-hydroxyethyl methacrylate and ϵ-caprolacton, polyethylene oxide di(meth)acrylate, polyethylene oxide-polypropylene oxide-polyethylene oxide di(meth)acrylate, or glycerol diglycidyl ether di(meth)acrylate.

Particularly preferred from the viewpoint of the efficiency in improvement of the oil repellency, is a bifunctional monomer such as polyethylene oxide di(meth)acrylate, polyethylene oxide-polypropylene oxide-polyethylene oxide di(meth)acrylate or glycerol diglycidyl ether di(meth)acrylate.

<Fluorocopolymer>

(1) In a case where the fluorocopolymer has polymerized unit (a), (b1) and (b2) and does not have polymerized units (c) and (d), the proportion of the polymerized units (a) in the fluorocopolymer is from 30 to 65 mass %, preferably from 40 to 65 mass %, the proportion of the polymerized units (b1) is from 1 to 67 mass %, preferably from 10 to 40 mass %, and the proportion of the polymerized units (b2) is from 3 to 34 mass %, preferably from 5 to 25 mass %. In a case where other monomers are also used, the proportion of polymerized units based on such other monomers is preferably at most 20 mass %, more preferably at most 10 mass %.

Further, in the fluorocopolymer, the proportion of the total content of EO chain ($-C_2H_4O-$) is from 20 to 65 mass %, preferably from 25 to 50 mass %, more preferably from 25 to 35 mass %, and the proportion of the total content of TO chain ($-C_4H_8O-$) is from 2 to 13 mass %, preferably from 3 to 10 mass %, more preferably from 4 to 8 mass %. It is particularly preferred that in the fluorocopolymer, the proportion of the total content of EO chain ($-C_2H_4O-$) is from 25 to 50 mass %, and the proportion of the total content of TO chain ($-C_4H_8O-$) is from 3 to 10 mass %.

Within the above range, in an article treated with the antifouling composition of the present invention, good water/oil repellency, good antifouling property and good durability against washing can be accomplished in good balance at the same time.

In the present invention, each of the proportions of the respective polymerized units, the proportion of EO chain and the proportion of TO chain, is a value obtainable from the charged amounts of the respective monomers, on the assumption that the mass of polymerized units derived from the polymerization initiator and chain transfer agent in the fluorocopolymer is 0 (zero).

(2) In a case where the fluorocopolymer has polymerized units (a), (b1), (b2) and (c) and does not have polymerized units (d), in the fluorocopolymer, the proportion of the polymerized units (a) is from 30 to 65 mass %, preferably from 40 to 65 mass %, the proportion of the polymerized units (b1) is from 1 to 65 mass %, preferably from 10 to 40 mass %, the proportion of the polymerized units (b2) is from 3 to 34 mass %, preferably from 5 to 25 mass %, and the proportion of the polymerized units (c) is from 2 to 10 mass %, preferably from 2 to 6 mass %. In a case where other monomers are also used, the proportion of the polymerized units based on such other monomers is preferably at most 20 mass %, more preferably at most 10 mass %.

The proportions of the contents of EO chain and TO chain are the same as in the above case (1).

By incorporating the polymerized units (c) to the fluorocopolymer, it becomes possible to readily disperse the fluorocopolymer in an aqueous medium.

(3) In a case where the fluorocopolymer has the polymerized units (a), (b1), (b2) and (d) and does not have the polymerized units (c), in the fluorocopolymer, the proportion of the polymerized units (a) is from 30 to 64 mass %, preferably from 40 to 64 mass %, the proportion of the polymerized units (b1) is from 1 to 66 mass %, preferably from 10 to 40 mass %, the proportion of the polymerized units (b2) is from 3 to 34 mass %, preferably from 5 to 25 mass %, and the proportion of the polymerized units (d) is from 1 to 5 mass %, preferably from 1 to 4 mass %. In a case where other monomers are also used, the proportion of the polymerized units based on such other monomers is preferably at most 20 mass %, more preferably at most 10 mass %.

The proportions of the contents of EO chain and TO chain are the same as in the above case (1).

By incorporating the polymerized units (d) to the fluorocopolymer, in an article treated with the antifouling composition of the present invention, particularly in an article wherein the substrate to be treated contains cotton, the effects can easily be maintained, and the durability will be improved. Further, the water/oil repellency and antifouling property will be better.

(4) In a case where the fluorocopolymer has the polymerized units (a), (b1), (b2), (c) and (d), in the fluorocopolymer, the proportion of the polymerized units (a) is from 30 to 64 mass %, preferably from 40 to 64 mass %, the proportion of the polymerized units (b1) is from 1 to 64 mass %, preferably from 10 to 40 mass %, the proportion of the polymerized units (b2) is from 3 to 34 mass %, preferably from 5 to 25 mass %, the proportion of the polymerized units (c) is from 2 to 10 mass %, preferably from 2 to 6 mass %, and the proportion of the polymerized units (d) is from 1 to 5 mass %, preferably from 1 to 4 mass %. In a case where other monomers are also used, the proportion of polymerized units based on such other monomers is preferably at most 20 mass %, more preferably at most 10 mass %.

The proportions of the contents of EO chain and TO chain are the same as in the above case (1).

In the fluorocopolymer of the present invention, the combination of the monomers (a), (b1) and (b2) is preferably such that the monomer (a) is at least one member selected from 3,3,4,4,5,5,6,6,7,7,8,8-tridecafluorooctyl (meth)acrylate, 3,3,4,4,5,5,6,6,6-nonafluorohexyl (meth)acrylate and 3,3,4,4,5,5,6,6,7,7,8,8-tridecafluorooctyl α-chloroacrylate; the monomer (b1) is methoxypolyethylene oxide methacrylate; and the monomer (b2) is polyethylene oxide-tetramethylene oxide) monomethacrylate.

The mass average molecular weight (Mw) of the fluorocopolymer is preferably from 5,000 to 100,000, more preferably from 10,000 to 50,000. When the mass average molecular weight is at least the lower limit value in the above range, the durability and oil repellency will be excellent, and when it is at most the upper limit value, the film forming property and liquid stability will be excellent.

In this specification, the mass average molecular weight of the fluorocopolymer is a molecular weight as calculated as polystyrene obtained by measurement by gel permeation chromatography by using a calibration curve prepared by using a standard polystyrene sample.

<Method for Producing Fluorocopolymer>

The fluorocopolymer in the present invention can be obtained by carrying out a polymerization reaction of monomers in a polymerization solvent by using a known method.

The polymerization solvent is not particularly limited, and it may, for example, be a ketone such as acetone, methyl ethyl ketone or methyl isobutyl ketone; an alcohol such as methanol or 2-propyl alcohol, an ester such as ethyl acetate or butyl acetate; an ether such as diisopropyl ether, tetrahydrofuran or dioxane; a glycol ether or its derivative, such as an ethyl ether or methyl ether of ethylene glycol, propylene glycol or dipropylene glycol; an aliphatic hydrocarbon; an aromatic hydrocarbon; a halogenated hydrocarbon such as perchloroethylene, trichloro-1,1,1-ethane, trichlorotrifluoroethane or dichloropentafluoropropane; dimethylformamide; N-methyl-2-pyrrolidone; butyroacetone; or dimethylsulfoxide (DMSO).

In the polymerization reaction to obtain the fluorocopolymer, the total concentration of monomers in all charged raw materials (including the polymerization solvent) is preferably within a range of from 5 to 60 mass %, more preferably within a range of from 10 to 40 mass %.

In the polymerization reaction to obtain the fluorocopolymer, it is preferred to employ a polymerization initiator. The polymerization initiator is preferably a peroxide such as benzyl peroxide, lauryl peroxide, succinic peroxide or tert-butyl perpivalate; an azo compound or the like. The concentration of the polymerization initiator in the solvent is preferably from 0.1 to 1.5 parts by mass per 100 parts by mass of the total amount of monomers.

Specific examples of the polymerization initiator are preferably 2,2'-azobis-2-methylbutyronitrile, dimethyl-2,2'-azobisisobutyrate, 2,2'-azobis[2-(2-imidazolin-2-yl)propane], 2,2'-azobis(4-methoxy-2,4-dimethylvaleronitrile), 1,1'-azobis(2-cyclohexane-1-carbonitrile), 2,2'-azobis(2,4-dimethylvaleronitrile), 1,1'-azobis(1-acetoxy-1-phenylethane), dimethylazobisisobutyrate, 4,4'-azobis(4-cyanovaleric acid), etc., more preferably 2,2'-azobis[2-(2-imidazolin-2-yl)propane] and 4,4'-azobis(4-cyanovaleric acid).

It is preferred to employ a chain transfer agent in the polymerization reaction to adjust the polymerization degree (molecular weight) of the fluorocopolymer. By using such a chain transfer agent, there is also such an effect that the total concentration of monomers in the solvent can be increased. The chain transfer agent may, for example, be preferably an alkyl mercaptan such as tert-dodecylmercaptan, n-dodecylmercaptan or stearyl mercaptan; aminoethanethiol, mercaptoethanol, 3-mercaptopropionic acid, 2-mercaptopropionic acid, mercaptosuccinic acid, thioglycolic acid, 3,3'-dithiodipropionic acid, 2-ethylhexyl thioglycolate, n-butyl thioglycolate, methoxybutyl thioglycolate, ethyl thioglycolate, 2,4-diphenyl-4-methyl-1-pentene, or carbon tetrachloride. The amount of the chain transfer agent is preferably from 0 to 2 parts by mass per 100 parts by mass of the total amount of monomers.

The reaction temperature during the polymerization reaction is preferably within a range of from room temperature to the boiling point of the reaction mixture. With a view to efficiently using the polymerization initiator, it is at least the half life temperature of the polymerization initiator, more preferably from 30 to 90° C.

The antifouling composition of the present invention preferably contains the fluorocopolymer containing the polymerized units (c) and an aqueous medium, wherein the content of a volatile organic solvent is at most 1 mass %.

In a case where as the antifouling composition of the present invention, a composition having the fluorocopolymer dispersed in an aqueous medium, wherein the content of a volatile organic solvent is at most 1 mass %, is to be obtained, an aqueous medium is added after the polymerization reaction, and treatment to remove the polymerization solvent is carried out as the case requires. The removal of the polymerization solvent is carried out, for example, by stripping (volatilization) treatment.

The aqueous medium may be a liquid containing water, wherein the content of a volatile organic solvent is at most 1 mass %, and it may specifically be preferably water or an azeotropic mixture containing water.

In the present invention, a volatile organic solvent in the antifouling composition means an organic solvent which volatilizes, when the antifouling composition is stored at room temperature, and specifically, it is an organic solvent having a boiling point at $1\times10^5$ Pa (hereinafter referred to simply as "a boiling point") being at most 100° C. Here, a solvent which forms an azeotropic mixture with water is not included in the volatile organic solvent.

In the antifouling composition in a form wherein the fluorocopolymer is dispersed in an aqueous medium, the content of the volatile organic solvent may be at most 1 mass % and is most preferably zero.

In a case where the fluorocopolymer is to be dispersed in an aqueous medium, such a fluoropolymer preferably contains the polymerized units (c). Further, as the polymerization solvent, it is preferred to employ a solvent having a relatively low boiling point (for example, a boiling point of at most 80° C.) or a solvent having an azeotropic composition with water, among the above-mentioned polymerization solvents, since the operation efficiency in treatment after the polymerization reaction is good. As an example of the solvent having a relatively low boiling point, acetone or methanol may be mentioned. The solvent having an azeotropic composition with water may, for example, be methyl ethyl ketone, methyl isobutyl ketone, 2-propyl alcohol, propylene glycol monomethyl ether or dipropylene glycol monomethyl ether. Acetone is more preferred.

In a case where the fluorocopolymer contains the polymerized units (c), it is preferred that after obtaining the fluorocopolymer by a polymerization reaction of monomers, amino groups in the copolymer are converted to amine salts, whereby the dispersibility of the copolymer in the aqueous medium will be improved.

For the conversion to amine salts, it is preferred to use an acid or the like, and it is more preferred to employ an acid having a dissociation constant or primary dissociation constant of at least $10^{-5}$. The acid may, for example, be preferably hydrochloric acid, hydrobromic acid, sulfonic acid, nitric acid, phosphoric acid, acetic acid, formic acid, propionic acid or lactic acid, more preferably acetic acid.

Otherwise, instead of converting amino groups of the fluorocopolymer to amine salts by using an acid, the amino groups may be converted to quaternary ammonium salt (conversion to quaternary salt) by using methyl iodide, ethyl iodide, dimethylsulfuric acid, diethylsulfuric acid, benzyl chloride, trityl phosphoric acid, methyl p-toluenesulfonic acid or the like.

<Antifouling Composition>

In a case where the antifouling composition of the present invention is in a form wherein the fluorocopolymer is dissolved in an organic solvent, the solid content concentration of the fluorocopolymer in the antifouling composition is preferably within a range of from 5 to 60 mass %, more preferably from 10 to 40 mass %.

In a case where the antifouling composition of the present invention is in a form wherein the fluorocopolymer is dispersed in an aqueous medium, the solid content concentration of the fluorocopolymer in the antifouling composition is preferably from 1 to 50 mass %, more preferably from 10 to 30 mass %.

Further, in a case where the antifouling composition of the present invention is practically applied for treatment of a substrate, the solid content concentration may suitably be selected depending upon the substrate, treating method, etc. For example, it is preferably from 0.05 to 10 mass %, more preferably from 0.1 to 5 mass %.

The antifouling composition of the present invention may preferably contain a crosslinking agent and/or catalyst to improve the adhesion to a substrate by forming crosslinkage with the substrate, in an amount of from 0.3 to 1 mass % in the antifouling composition at the time of application to actual treatment of the substrate.

As such a crosslinking agent, a known crosslinking agent may suitably be used. Specifically, it may, for example, be urea or a condensate or preliminary condensate of melamine formaldehyde, a methylol-dihydroxyethylene-urea or its derivative, uron, methylol-ethylene-urea, methylol-propylene-urea, methylol-triazone, a dicyandiamide-formaldehyde condensate, methylol-carbamate, methylol-(meth)acrylamide, a polymer thereof, divinylsulfone, polyamide or its cation derivative, an epoxy derivative of e.g. diglycidyl glycerol, a halide derivative such as (epoxy-2,3-propyl)trimethylammonium chloride or N-methyl-N-(epoxy-2,3-propyl)morpholinium chloride, a pyridinium salt of chloromethyl ether of ethylene glycol, a polyamine-polyamide-epichlorohydrin resin or polyvinyl alcohol.

The above catalyst may preferably be ammonium chloride or an alkanolamine salt.

Various additives may be contained in the antifouling composition of the present invention. Such additives may, for example, be a fluorine-type water/oil repellent agent not included in the scope of the fluorocopolymer in the present invention, a non-fluorine type polymer blender, a penetrating agent, a defoaming agent, a film forming assistant, an insecticide, a flame retardant, an antistatic agent, an anticrease agent, a softener, etc.

<Treated Article>

The treated article of the present invention is one having the antifouling composition applied to a substrate.

The substrate is not particularly limited, and it may, for example, be fiber, fiber fabric, knitted fabric, nonwoven fabric, glass, paper, wood, leather, artificial leather, fur, asbestos, bricks, cement, ceramics, metal or metal oxide, ceramic product, plastics, etc. Among them, fiber, fiber fabric, knitted fabric or nonwoven fabric is more preferred. Examples of the fiber include animal or plant natural fiber such as cotton, hemp, wool or silk, a synthetic fiber such as polyamide, polyester, polyvinyl alcohol, polyacrylonitrile, polyvinyl chloride or polypropylene, a semisynthetic fiber such as rayon or acetate, an inorganic fiber such as glass fiber, and mixed fibers thereof.

The method for applying the antifouling composition to the substrate is not particularly limited so long as it is a method capable of attaching the antifouling composition to the substrate. For example, a method is preferred which comprises applying it to the surface of a substrate by a known coating method such as impregnation, immersion, spraying, brushing, padding, size press coating or roller coating, followed by drying. The drying may be carried out at room temperature or under heating, and is preferably carried out under heating. In the case of heating, the temperature is at a level of from 40 to 200° C. Further, in a case where the antifouling composition contains a crosslinking agent, it is preferred to carry out curing by heating at a temperature of at least the crosslinking temperature of the crosslinking agent, as the case requires.

In the treated article thus obtained, a coating film made of the antifouling composition of the present invention is attached to the surface of the substrate, and preferably, the surface of the substrate is covered with such a coating film.

According to the present invention, a perfluoroalkyl group having a shorter chain than ever is used as the perfluoroalkyl group contained in the fluorocopolymer, and nevertheless, a treated article obtained by treating a substrate with the antifouling composition of the present invention is excellent in the water/oil repellency and antifouling property and is also excellent in the durability against washing.

Further, according to the present invention, such a fluorocopolymer may be dispersed in an aqueous medium to obtain an antifouling composition. Accordingly, it is possible to realize an environment-responsive antifouling composition which contains little or no volatile organic solvent.

As clearly shown in Example 1 and Comparative Examples 1 and 2 given hereinafter, by incorporating EO and TO as alkylene oxide chains, the durability against washing will be improved as compared with a case (Comparative Example 1) where only EO is incorporated and a case (Comparative Example 2) where EO and a propylene oxide chain (—$C_3H_6O$—, hereinafter sometimes referred to as PO) are incorporated, and the water/oil repellency and antifouling property will also be good. Such improvement is considered to be such that by the use of the polymerized units (b2) containing TO, the adhesion of the antifouling composition to the substrate is effectively improved. The reason is such that the monomer containing EO and TO has lower Tg (glass transition point) than a monomer containing EO or PO only, and consequently, Tg of the fluorocopolymer tends to be low, and the film-forming property will be improved. Further, by incorporating TO and EO in a specific ratio, excellent durability against washing, and good water/oil repellency and antifouling property, are considered to have been obtained at the same time in good balance.

Further, in the antifouling composition of the present invention, the monomer (a) having $R^F$ groups having at most 6 carbon atoms is used as the raw material, whereby it is possible to bring the content of a perfluorooctanoic acid (PFOA), perfluorooctanesulfonic acid (PFOS) and precursors or analogues thereof (i.e. the content in a case where the solid content concentration in the antifouling composition is 20 mass %) to a level of not higher than the detection limit as an analytical value of LC/MS/MS by the method disclosed in Japanese Patent Application No. 2007-333564.

EXAMPLES

Now, the present invention will be described in further detail with reference to Examples, but it should be understood that the present invention is by no means restricted to such Examples. In the following, "%" means "mass %" unless otherwise specified. Further, in a chemical formula representing a compound containing an alkylene oxide chain, the value for the alkylene oxide chain length is an average value.

Evaluation of various properties was carried out by the following methods.

[Preparation of Test Cloth: Method of Treating Substrate Cloth]

In 150 g of a treating liquid obtained in each of the following Examples, a substrate cloth (non-treated cloth) was dipped and then squeezed by a mangle to a wet pickup of from 80 to 90%. Then, it was dried at 110° C. for 90 seconds and further subjected to curing heat treatment at 170° C. for 60 seconds to obtain a test cloth.

As the substrate cloth (non-treated cloth), two types i.e. (1) a tropical cloth (hereinafter referred to as PET) made of non-dyed polyester, and (2) a broad cloth (hereinafter referred to as TC) having polyester/cotton blended at a rate of 65/35, were used.

[Method for Evaluation of Oil Repellency: Oil Repellency Grades (OR)]

With respect to the test cloth prepared by the above method, the oil repellency was evaluated in accordance with AATCC standards-TM118 method and shown by the oil repellency grades as identified in Table 1. The oil repellency grades are based on the wettability to the cloth, of eight types of hydrocarbon solvents (test liquids) different in the surface tension. The higher the oil repellency grade, the higher the oil repellency. Symbol +(−) for the oil repellency grade indicates that the performance in question is slightly better (poor). This oil repellency grade will be represented by "OR".

[Evaluation of Durability Against Washing]

Washing was carried out in accordance with JIS L-0217 103 washing method. Here, as detergent, weakly alkaline detergent is used, and no ion finishing is carried out. The evaluation result after carrying out washing once is shown in the section for "Initial", and the evaluation result after repeating the same washing method 5 time is shown in the section for "HL5". In Example 1 and Comparative Examples 1 and 2, in order to evaluate the durability against washing for a long period of time, the same washing method was repeated 10 times and 15 times to carry out the evaluations respectively, and the respective evaluation results are shown in the sections for "HL10" and "HL15", respectively.

TABLE 1

| Oil repellency grade | Test liquid | Surface tension of test liquid dyn/cm (25° C.) |
|---|---|---|
| 8 | n-heptane | 20.0 |
| 7 | n-octane | 21.8 |
| 6 | n-decane | 23.5 |
| 5 | n-dodecane | 25.0 |
| 4 | n-tetradecane | 26.7 |
| 3 | n-hexadecane | 27.3 |
| 2 | 65 parts of Nujol/35 parts of hexadecane | 29.6 |
| 1 | Nujol | 31.2 |
| 0 | Less than 1 | |

[Method for Evaluation of Soil Release Property (SR Property)]

To the test cloth prepared by the above method, each of the following three types of soiling liquids was attached, followed by washing, whereby the soil releasing property was evaluated by the following method. For the judgment, the degree of removal of the soiling liquid was visually observed and represented by the grades identified in Table 2. The higher the grade, the higher the soil releasing property. Symbol +(−) for the soiling liquid-releasing degree grade indicates that the performance in question is slightly better (poor).

[Oily Stain 1(DMO)]

A test cloth was spread on a blotting paper placed horizontally, and 5 drops (about 0.2 ml) of a soiling liquid having 0.1 mass % of carbon black added to used engine oil, were dropped thereon. A polyethylene sheet was put thereon, and a weight of 60 g was placed thereon. One hour later, the weight and the polyethylene sheet were removed. An excess soiling liquid was wiped off with a filter paper, and the test cloth was left to stand at room temperature for 20 minutes and then subjected to washing. Evaluation against this soiling liquid will be hereinafter represented by "DMO".

[Aqueous Stain]

The same operation as in the above [Oily Stain (DMO)] was carried out except that as the soiling liquid, one prepared by mixing the same amounts of a 0.1 mass % aqueous solution of food red color No. 2 (chemical name: amaranth) as a food additive and a 10.0 mass % aqueous solution of sucrose (saccharose), was used. Evaluation against this soiling liquid will hereinafter be represented by "Aqueous stain".

[Oily Stain 2]

A test cloth was spread on a blotting paper placed horizontally, and 3 drops (about 0.1 ml) of a liquid prepared by mixing 61.5 mass % of olive oil, 38.0 mass % of oleic acid, 1.0 mass % of iron(III) oxide for ferrite and 0.5 mass % of Oil red were dropped thereon from a height of 10 cm and left to stand for 1 minute. Then, an excess soiling liquid was wiped off by filter paper, and the test cloth was left to stand at room temperature for 20 minutes and then subjected to washing. Evaluation against this soiling liquid will hereinafter be represented by "Oily stain 2".

TABLE 2

| Soiling liquid-releasing degree grade | Evaluation standards |
|---|---|
| 5 | The stain was completely removed. |
| 4 | The stain was not completely removed and slightly remained. |
| 3 | The profile of the stain was vague, but the degree of removal was low. |
| 2 | The profile of the stain was clear. |
| 1 | The stain was not substantially removed. |
| 0 | The stain was not removed at all. |

Example 1

Into a 100 mL glass container, 12.0 g (60 parts by mass) of $C_6F_{13}C_2H_4OCOC(CH_3)=CH_2$ (purity: 99.7 mass %, hereinafter referred to as C6FMA) as the monomer (a), 6.0 g (30 parts by mass) of $CH_2=C(CH_3)COO(EO)_9CH_3$ (hereinafter referred to as MEO400M) as the monomer (b1), 2.0 g (10 parts by mass) of $CH_2=C(CH_3)COO-(-(EO)_{10}-(TO)_5-)-H$ (EO and TO are randomly contained, hereinafter referred to as MEOTO800) as the monomer (b2), 59.8 g of acetone as a polymerization solvent and 0.2 g (1 part by mass) of 2,2'-azobis[2-(2-imidazolin-2-yl)propane] (hereinafter referred to as AIP) as a polymerization initiator, were charged and polymerized at 65° C. for 20 hours while being shaken in a nitrogen atmosphere, to obtain a slightly yellow solution having a solid content concentration of 24.9% (a polymer solution containing a fluorocopolymer).

The contents of the respective polymerized units, the content of EO, the content of TO and the content of PO, in the fluorocopolymer are shown in Table 6 (the same applies to the following Examples and Comparative Examples). In Table 6, "%" is "mass %".

To deionized water, a solution having 0.14 g of acetic acid added to the obtained polymer solution so that it would be 3.0 times by molar equivalent of AIP, BECKAMINE M-3 (melamine crosslinking agent, manufactured by DIC Corporation) as a crosslinking agent, and ACX (catalyst of melamine crosslinking agent M3, manufactured by DIC Corporation) as a catalyst were added to obtain a treating liquid wherein the solid content concentration of the fluorocopolymer was 1.8 mass %, the concentration of the crosslinking agent was 0.3 mass %, and the concentration of the catalyst was 0.3 mass %.

Using the obtained treating liquid, a test cloth was prepared by the above-mentioned method and evaluated by the above evaluation methods, and the results are shown in Table 3 (the same applies to Comparative Examples 1 and 2).

Comparative Example 1

Polymerization was carried out in the same manner as in Example 1 except that in Example 1, MEOTO800 was not used, and the amount of MEO400M was changed to 8.0 g (40 parts by mass) to obtain a slightly yellow solution (a polymer solution containing a fluorocopolymer) having a solid content concentration of 25.3%. Further, by carrying out the same operation as in Example 1, a treating liquid having a solid content concentration of the fluorocopolymer being 25.2 mass %, was obtained.

Comparative Example 2

Polymerization was carried out in the same manner as in Example 1 except that in Example 1, instead of MEOTO800, 2.0 g (10 parts by mass) of $CH_2=C(CH_3)COO(C_3H_6O)_9H$ (hereinafter referred to as MPO500) containing neither EO nor TO was used, to obtain a slightly yellow solution (a polymer solution containing a fluorocopolymer) having a solid content concentration of 25.4%. Further, by carrying out the same operation as in Example 1, a treating liquid was obtained wherein the solid content concentration of the fluorocopolymer was 25.4 mass %.

TABLE 3

| Example | Substrate cloth | Number of washing times | OR | DMO | Aqueous stain | Oily stain 2 |
|---|---|---|---|---|---|---|
| Example 1 | PET | Initial | 6 | 5 | 4+ | 3+ |
|  |  | HL5 | 5 | 4+ | 5 | 3 |
|  |  | HL10 | 5 | 4+ | 5 | 3 |
|  |  | HL15 | 5− | 4+ | 5 | 3 |
|  | TC | Initial | 5+ | 4 | 4 | 2+ |
|  |  | HL5 | 5 | 4 | 5 | 2+ |
|  |  | HL10 | 5− | 3 | 5 | 2+ |
|  |  | HL15 | 4+ | 3 | 5 | 2 |
| Comparative Example 1 | PET | Initial | 5 | 5 | 4+ | 3+ |
|  |  | HL5 | 4 | 4 | 5 | 3− |
|  |  | HL10 | 3 | 4 | 5 | 3− |
|  |  | HL15 | 3− | 3 | 4 | 2 |
|  | TC | Initial | 5 | 3+ | 4 | 2+ |
|  |  | HL5 | 2 | 3 | 4+ | 2 |
|  |  | HL10 | 0 | 2 | 4 | 2 |
|  |  | HL15 | 0 | 2 | 3+ | 1+ |
| Comparative Example 2 | PET | Initial | 5+ | 4 | 4+ | 3 |
|  |  | HL5 | 4 | 4 | 5 | 3 |
|  |  | HL10 | 4− | 4 | 5 | 3 |
|  |  | HL15 | 3 | 3+ | 5 | 2+ |
|  | TC | Initial | 5− | 4 | 3 | 2 |
|  |  | HL5 | 3− | 3 | 4 | 2 |
|  |  | HL10 | 2 | 2 | 3+ | 2 |
|  |  | HL15 | 0 | 2 | 3+ | 1+ |

From the results in Table 3, it is evident that the test cloth prepared in Example 1 is excellent in oil repellency (OR) with respect to each of PET and TC, and the soil release property is also good. Especially, as compared with Comparative Example 1 containing no polymerized units (b2) and Comparative Example 2 containing polymerized units containing propylene oxide (PO) instead of polymerized units (b2), Example 1 is observed to be excellent in durability against washing with little decrease in the performance even after repeating washing 15 times.

Example 2

Into a 100 mL glass container, 11.2 g (56 parts by mass) of C6FMA, 5.0 g (25 parts by mass) of MEO400M, 2.8 g (14 parts by mass) of MEOTO800, 0.8 g (4 parts by mass) of N,N-dimethylaminoethyl methacrylate (hereinafter referred to as DM) as the monomer (c), 0.2 g (1 part by mass) of a 3,5-dimethylpyrazole adduct (hereinafter referred to as iso) of 2-isocyanateethyl methacrylate as the monomer (d), 59.8 g of acetone and 0.2 g (1 part by mass) of 4,4'-azobis(4-cyanovaleric acid) (hereinafter referred to as ACP) as a polymerization initiator, were charged and polymerized at 65° C. for 20 hours while being shaked in a nitrogen atmosphere, to obtain a slightly yellow solution having a solid content concentration of 24.6 mass % (polymer solution containing a fluorocopolymer).

To 50 g of the obtained polymer solution, 60 g of water and 0.28 g (1.5 times by molar equivalent of DM) of acetic acid were added, followed by stirring to carry out treatment for an amine salt. Thereafter, acetone was removed under a reduced pressure condition at 60° C. to obtain a slightly yellow transparent aqueous dispersion. Then, deionized water was added thereto to obtain an aqueous dispersion having a solid content concentration of 20 mass %. The obtained aqueous dispersion was measured by capillary gas chromatography, whereby the acetone content was confirmed to be at most 1 mass %.

To deionized water, the obtained aqueous dispersion, BECKAMINE M-3 (manufactured by DIC Corporation) as a crosslinking agent, and ACX (manufactured by DIC Corporation) as a catalyst were added to obtain a treating liquid wherein the solid content concentration of the fluorocopolymer was 1.8 mass %, the concentration of the crosslinking agent was 0.3 mass %, and the concentration of the catalyst was 0.3 mass %.

Using the obtained treating liquid, a test cloth was prepared by the above-described method and evaluated by the above-described evaluation methods, and the results are shown in Tables 4 and 5 (the same applies to the following Examples and Comparative Examples).

Example 3

Polymerization was carried out in the same manner as in Example 2 except that in Example 2, as the monomer (b2), instead of MEOTO800, $CH_2=C(CH_3)COO$-(-(EO)$_5$-(TO)$_2$—)—H (wherein EO and TO are randomly contained, hereinafter referred to as MEOTO400) was used, to obtain a slightly yellow solution having a solid content concentration of 25.7% (a polymer solution containing a fluorocopolymer).

Thereafter, the same operation as in Example 2 was carried out to obtain an aqueous dispersion having an acetone content of at most 1 mass %, and further in the same manner as in Example 2, a treating liquid was obtained.

Comparative Example 3

Polymerization was carried out in the same manner as in Example 2 except that in Example 2, the amount of MEO400M was changed to 7.4 g (37 parts by mass), and the amount of MEOTO800 was changed to 0.4 g (2 parts by mass), to obtain a slightly yellow solution having a solid content concentration of 24.9% (a polymer solution containing a fluorocopolymer).

Thereafter, in the same manner as in Example 2, a treating liquid was obtained.

Comparative Example 4

Polymerization was carried out in the same manner as in Example 3 except that in Example 3, the amount of MEO400M was changed to 0.2 g (1 part by mass), and the amount of MEOTO400 was changed to 7.6 g (38 parts by mass), to obtain a slightly yellow solution having a solid content concentration of 25.2% (a polymer solution containing a fluorocopolymer).

Thereafter, the same operation as in Example 2 was carried out to obtain an aqueous dispersion having an acetone content of at most 1 mass %. The obtained aqueous dispersion was highly turbid. Further, in the same manner as in Example 2, a treating liquid was obtained.

Comparative Example 5

Polymerization was carried out in the same manner as in Example 2 except that in Example 2, instead of MEOTO800, 2.8 g (14 parts by mass) of MPO500 was used, to obtain a slightly yellow solution having a solid content concentration of 24.9% (a polymer solution containing a fluorocopolymer). Thereafter, in the same manner as in Example 2, a treating liquid was obtained.

Comparative Example 6

Polymerization was carried out in the same manner as in Example 2 except that in Example 2, instead of MEOTO800, 2.8 g (14 parts by mass) of $CH_2=C(CH_3)COO(PO)_{13}H$ (hereinafter referred to as MPO800) was used, to obtain a slightly yellow solution having a solid content concentration of 25.2% (a polymer solution containing a fluorocopolymer). Thereafter, in the same manner as in Example 2, a treating liquid was obtained.

Comparative Example 7

Polymerization was carried out in the same manner as in Example 2 except that in Example 2, instead of MEOTO800, 2.8 g (14 parts by mass) of $CH_2=C(CH_3)COO(EO)_5—(PO)_2—H$ (wherein ethylene oxide and propylene oxide are contained in block, hereinafter referred to as MEOPO350B) was used, to obtain a slightly yellow solution having a solid content concentration of 25.3% (a polymer solution containing a fluorocopolymer). Thereafter, in the same manner as in Example 2, a treating liquid was obtained.

Example 4

Polymerization was carried out in the same manner as in Example 2 except that in Example 2, instead of C6FMA, 11.2 g (56 parts by mass) of $C_6F_{13}C_2H_4OCOCH=CH_2$ (purity: 99.6 mass %, hereinafter referred to as C6FA) was used, and the charged amount of ACP was changed to 0.32 g (1.6 parts by mass), to obtain a slightly yellow solution having a solid content concentration of 24.5% (a polymer solution containing a fluorocopolymer). Thereafter, in the same manner as in Example 2, a treating liquid was obtained.

Example 5

Polymerization was carried out in the same manner as in Example 2 except that in Example 2, instead of C6FMA, 12.0 g (60 parts by mass) of $C_4F_9C_2H_4OCOC(CH_3)=CH_2$ (purity: 99.9 mass %, hereinafter referred to as C4FMA) was used, and the amount of MEOTO800 was changed to 2.0 g (10 parts by mass), to obtain a slightly yellow solution having a solid content concentration of 25.4% (a polymer solution containing a fluorocopolymer). Thereafter, in the same manner as in Example 2, a treating liquid was obtained.

Example 6

Polymerization was carried out in the same manner as in Example 5, except that in Example 5, instead of C4FMA, 12.0 g (60 parts by mass) of $C_4F_9C_2H_4OCOCH=CH_2$ (purity: 100 mass %, hereinafter referred to as C4FA) was used, and the charged amount of ACP was changed to 0.32 g (1.6 parts by mass), to obtain a slightly yellow solution having a solid content concentration of 24.6% (a polymer solution containing a fluorocopolymer). Thereafter, in the same manner as in Example 2, a treating liquid was obtained.

Example 7

Polymerization was carried out in the same manner as in Example 2, except that in Example 2, instead of C6FMA, 11.2 g (56 parts by mass) of $C_6F_{13}C_2H_4OCOC(Cl)=CH_2$ (purity: 98.9 mass %, hereinafter referred to as αCl-C6FA) was used, to obtain a slightly yellow solution having a solid content concentration of 25.3% (a polymer solution containing a fluorocopolymer).

Thereafter, the same operation as in Example 2 was carried out to obtain an aqueous dispersion having an acetone content of at most 1 mass %. The obtained aqueous dispersion had slight turbidity. Further, in the same manner as in Example 2, a treating liquid was obtained.

Comparative Example 8

Polymerization was carried out in the same manner as in Example 4, except that in Example 4, instead of MEOTO800, 2.8 g (14 parts by mass) of MPO500 was used, to obtain a slightly yellow solution having a solid content concentration of 24.6% (a polymer solution containing a fluorocopolymer). Thereafter, in the same manner as in Example 2, a treating liquid was obtained.

Comparative Example 9

Polymerization was carried out in the same manner as in Example 5 except that in Example 5, instead of MEOTO800, 2.0 g (10 parts by mass) of MPO500 was used, to obtain a slightly yellow solution having a solid content concentration of 25.2% (a polymer solution containing a fluorocopolymer). Thereafter, in the same manner as in Example 2, a treating liquid was obtained.

Comparative Example 10

Polymerization was carried out in the same manner as in Example 6 except that in Example 6, instead of MEOTO800, 2.0 g (10 parts by mass) of MPO500 was used, to obtain a slightly yellow solution having a solid content concentration of 25.1% (a polymer solution containing a fluorocopolymer). Thereafter, in the same manner as in Example 2, a treating liquid was obtained.

Comparative Example 11

Polymerization was carried out in the same manner as in Example 7 except that in Example 7, instead of MEOTO800, 2.8 g (14 parts by mass) of MPO500 was used, to obtain a slightly yellow solution having a solid content concentration of 25.4% (a polymer solution containing a fluorocopolymer). Thereafter, in the same manner as in Example 2, a treating liquid was obtained.

TABLE 4

| Example | Substrate cloth | Number of washing times | OR | DMO | Aqueous stain | Oily stain 2 |
|---|---|---|---|---|---|---|
| Example 2 | PET | Initial | 5+ | 5 | 4 | 4+ |
|  |  | HL5 | 5− | 5 | 5 | 3+ |
|  | TC | Initial | 6− | 4+ | 4 | 3+ |
|  |  | HL5 | 4+ | 4 | 5 | 2+ |
| Example 3 | PET | Initial | 5 | 5 | 4+ | 4 |
|  |  | HL5 | 4+ | 4+ | 5 | 3 |
|  | TC | Initial | 5 | 4 | 4 | 3+ |
|  |  | HL5 | 4+ | 4 | 5 | 2+ |

TABLE 4-continued

| Example | Substrate cloth | Number of washing times | OR | DMO | Aqueous stain | Oily stain 2 |
|---|---|---|---|---|---|---|
| Comparative Example 3 | PET | Initial | 5 | 5 | 4 | 3 |
|  |  | HL5 | 3 | 3 | 4 | 2+ |
|  | TC | Initial | 5 | 3+ | 4 | 3 |
|  |  | HL5 | 2 | 3 | 4 | 2− |
| Comparative Example 4 | PET | Initial | 4+ | 3 | 4+ | 2 |
|  |  | HL5 | 4 | 2+ | 5 | 2 |
|  | TC | Initial | 4 | 2 | 4 | 2 |
|  |  | HL5 | 4− | 2 | 5 | 2 |
| Comparative Example 5 | PET | Initial | 5 | 5 | 4 | 3+ |
|  |  | HL5 | 4 | 4+ | 5 | 3− |
|  | TC | Initial | 5− | 4 | 4 | 2+ |
|  |  | HL5 | 3 | 4 | 5 | 2 |
| Comparative Example 6 | PET | Initial | 5− | 5 | 3+ | 3 |
|  |  | HL5 | 4 | 5 | 5 | 3− |
|  | TC | Initial | 5 | 3+ | 4 | 2 |
|  |  | HL5 | 3+ | 3+ | 5 | 2 |
| Comparative Example 7 | PET | Initial | 3 | 5 | 3 | 3 |
|  |  | HL5 | 2 | 3 | 5 | 2+ |
|  | TC | Initial | 4 | 3+ | 4 | 2 |
|  |  | HL5 | 2 | 2+ | 5 | 2 |

TABLE 5

| Example | Substrate cloth | Number of washing times | OR | DMO | Aqueous stain | Oily stain 2 |
|---|---|---|---|---|---|---|
| Example 4 | PET | Initial | 4 | 4+ | 4 | 3+ |
|  |  | HL5 | 4− | 4+ | 5 | 3+ |
|  | TC | Initial | 4 | 4 | 3 | 2+ |
|  |  | HL5 | 4− | 4 | 4 | 2 |
| Example 5 | PET | Initial | 3− | 4 | 3+ | 3 |
|  |  | HL5 | 2 | 3+ | 5 | 3 |
|  | TC | Initial | 3 | 3 | 4 | 2 |
|  |  | HL5 | 2+ | 3 | 4+ | 2 |
| Example 6 | PET | Initial | 2 | 4 | 3+ | 3+ |
|  |  | HL5 | 2− | 4 | 5 | 3+ |
|  | TC | Initial | 2 | 3 | 2+ | 2+ |
|  |  | HL5 | 2− | 3 | 3 | 2+ |
| Example 7 | PET | Initial | 6− | 5 | 4+ | 4 |
|  |  | HL5 | 5− | 4 | 5 | 3 |
|  | TC | Initial | 5+ | 4 | 4+ | 3 |
|  |  | HL5 | 4+ | 4 | 5 | 2 |
| Comparative Example 8 | PET | Initial | 3− | 4 | 4 | 3+ |
|  |  | HL5 | 3− | 4 | 5 | 3 |
|  | TC | Initial | 4− | 4 | 3 | 2+ |
|  |  | HL5 | 4− | 4 | 3 | 2 |
| Comparative Example 9 | PET | Initial | 2+ | 4 | 3+ | 2+ |
|  |  | HL5 | 2 | 2+ | 5 | 2+ |
|  | TC | Initial | 3 | 2+ | 3+ | 2 |
|  |  | HL5 | 2 | 2+ | 4+ | 2 |
| Comparative Example 10 | PET | Initial | 2− | 4 | 3 | 3 |
|  |  | HL5 | 2− | 4 | 5 | 3 |
|  | TC | Initial | 2 | 3 | 2+ | 2+ |
|  |  | HL5 | 2− | 3 | 3 | 2 |
| Comparative Example 11 | PET | Initial | 5 | 4+ | 4+ | 3+ |
|  |  | HL5 | 3 | 4 | 5 | 3 |
|  | TC | Initial | 5 | 4 | 4+ | 2+ |
|  |  | HL5 | 3− | 3 | 4+ | 2 |

TABLE 6

| | Polymerized units (a) | | Polymerized units (b1) | | Polymerized units (b2) | | Polymerized units (c) | | Polymerized units (d) | | Other polymerized units | | EO content | TO content | PO content |
|---|---|---|---|---|---|---|---|---|---|---|---|---|---|---|---|
| Ex. 1 | C6FMA | 60% | MEO400M | 30% | MEOTO800 | 10% |  | 0% |  | 0% |  | 0% | 29% | 4% | 0% |
| Comp. Ex. 1 | C6FMA | 60% | MEO400M | 40% |  | 0% |  | 0% |  | 0% |  | 0% | 32% | 0% | 0% |
| Comp. Ex. 2 | C6FMA | 60% | MEO400M | 30% |  | 0% |  | 0% |  | 0% | MPO500 | 10% | 24% | 0% | 9% |
| Ex. 2 | C6FMA | 56% | MEO400M | 25% | MEOTO800 | 14% | DM | 4% | iso | 1% |  | 0% | 27% | 6% | 0% |
| Ex. 3 | C6FMA | 56% | MEO400M | 25% | MEOTO400 | 14% | DM | 4% | iso | 1% |  | 0% | 26% | 5% | 0% |
| Comp. Ex. 3 | C6FMA | 56% | MEO400M | 37% | MEOTO800 | 2% | DM | 4% | iso | 1% |  | 0% | 31% | 1% | 0% |
| Comp. Ex. 4 | C6FMA | 56% | MEO400M | 1% | MEOTO400 | 38% | DM | 4% | iso | 1% |  | 0% | 18% | 14% | 0% |
| Comp. Ex. 5 | C6FMA | 56% | MEO400M | 25% |  | 0% | DM | 4% | iso | 1% | MPO500 | 14% | 20% | 0% | 12% |
| Comp. Ex. 6 | C6FMA | 56% | MEO400M | 25% |  | 0% | DM | 4% | iso | 1% | MPO800 | 14% | 20% | 0% | 13% |
| Comp. Ex. 7 | C6FMA | 56% | MEO400M | 25% |  | 0% | DM | 4% | iso | 1% | MEOPO350B | 14% | 27% | 0% | 4% |
| Ex. 4 | C6FA | 56% | MEO400M | 25% | MEOTO800 | 14% | DM | 4% | iso | 1% |  | 0% | 27% | 6% | 0% |
| Ex. 5 | C4FMA | 60% | MEO400M | 25% | MEOTO800 | 10% | DM | 4% | iso | 1% |  | 0% | 25% | 4% | 0% |
| Ex. 6 | C4FA | 60% | MEO400M | 25% | MEOTO800 | 10% | DM | 4% | iso | 1% |  | 0% | 25% | 4% | 0% |
| Ex. 7 | αCl-C6FA | 56% | MEO400M | 25% | MEOTO800 | 14% | DM | 4% | iso | 1% |  | 0% | 27% | 6% | 0% |
| Comp. Ex. 8 | C6FA | 56% | MEO400M | 25% |  | 0% | DM | 4% | iso | 1% | MPO500 | 14% | 20% | 0% | 12% |
| Comp. Ex. 9 | C4FMA | 60% | MEO400M | 25% |  | 0% | DM | 4% | iso | 1% | MPO500 | 10% | 20% | 0% | 9% |
| Comp. Ex. 10 | C4FA | 60% | MEO400M | 25% |  | 0% | DM | 4% | iso | 1% | MPO500 | 10% | 20% | 0% | 9% |
| Comp. Ex. 11 | αCl-C6FA | 56% | MEO400M | 25% |  | 0% | DM | 4% | iso | 1% | MPO500 | 14% | 20% | 0% | 12% |

As shown by the results in Tables 4 and 5, the test cloth obtained in each Example was good in water/oil repellency, antifouling property and durability against washing with respect to each of PET and TC.

Whereas, in Comparative Example 3 wherein the TO content is small, the performance particularly in HL5 is low as compared with Example 2, and it is evident that the durability against washing is poor.

In Comparative Example 4 wherein the TO content is large, and the EO content is small, the initial OR and DMO are particularly low as compared with Example 3, and the oily stain 2 also shows a low value, and it is evident that the water/oil repellency and the antifouling property against oily stain are poor.

In Comparative Examples 5 to 7 wherein TO is not contained, and PO is contained, the performance is poor particularly in OR and oily stain 2 as compared with Examples 2 and 3.

In Comparative Example 8 as compared with Example 4, in Comparative Example 9 as compared with Example 5, in Comparative Example 10 as compared with Example 6, and in Comparative Example 11 as compared with Example 7, the performance is poor in OR and DMO, and the durability against washing is also poor.

Industrial Applicability

The present invention is useful widely as an antifouling agent capable of imparting an excellent antifouling property to various substrates such as fibers.

The entire disclosure of Japanese Patent Application No. 2007-135412 filed on May 22, 2007 including specification, claims and summary is incorporated herein by reference in its entirety.

What is claimed is:

1. An antifouling composition comprising a fluorocopolymer which comprises from 30 to 65 mass % of polymerized units (a) based on the following monomer (a), from 1 to 67 mass % of polymerized units (b1) based on the following monomer (b1) and from 3 to 34 mass % of polymerized units (b2) based on the following monomer (b2), wherein the content of —$(C_2H_4O)$— is from 20 to 65 mass %, and the content of —$(C_4H_8O)$— is from 2 to 13 mass %:

monomer (a): a compound represented by $(Z-Y)_nX$, wherein Z is a $C_{1-6}$ perfluoroalkyl group or a monovalent group represented by $C_mF_{2m+1}O(CFWCF_2O)_dCFK$— wherein m is an integer of from 1 to 6, d is an integer of from 0 to 4, and each of W and K which are independent of each other, is a fluorine atom or a trifluoromethyl group, Y is a bivalent organic group or a single bond, n is 1 or 2, when n is 1, X is —CR=$CH_2$, —COOCR=$CH_2$, —OCOCR=$CH_2$, —$OCH_2$-φ-CR=$CH_2$ or —OCH=$CH_2$, and when n is 2, X is —CH[—$(CH_2)_p$CR=$CH_2$]—, —CH[—$(CH_2)_p$COOCR=$CH_2$]—, —CH[—$(CH_2)_p$OCOCR=$CH_2$]—or —OCOCH=CHCOO—, R is a hydrogen atom, a methyl group or a halogen atom, φ is a phenylene group, and p is an integer of from 0 to 4, monomer (b1): a compound represented by $CH_2$=$CR^1$-$G^1$-$(C_2H_4O)_{q1}$-$R^2$, monomer (b2): a compound represented by $CH_2$=$CR^3$-$G^2$-$(C_2H_4O)_{q2}$—$(C_4H_8O)_{q3}$—$R^4$, wherein each of $R^1$, $R^2$, $R^3$ and $R^4$ which are independent of one another, is a hydrogen atom or a methyl group, each of q1 and q3 which are independent of each other, is an integer of from 1 to 50, q2 is an integer of from 1 to 50, each of $G^1$ and $G^2$ which are independent of each other, is —COO$(CH_2)_r$— or —COO$(CH_2)_t$—NHCOO— wherein r is an integer of from 0 to 4, and t is an integer of from 1 to 4.

2. The antifouling composition according to claim 1, wherein the fluorocopolymer contains from 2 to 10 mass % of polymerized units (c) based on the following monomer (c):

monomer (c): a compound represented by $CH_2$=$CR^5$-M-Q-$NR^6R^7$ or $CH_2$=$CR^5$-M-Q-N(O)$R^6R^7$, wherein $R^5$ is a hydrogen atom or a methyl group, M is —COO— or —CONH—, Q is a $C_{2-4}$ alkylene group or a $C_{2-3}$ alkylene group having some or all of hydrogen atoms substituted by hydroxy groups, each of $R^6$ and $R^7$ which are independent of each other, is a benzyl group, a $C_{1-8}$ alkyl group or a $C_{2-3}$ alkyl group having some of hydrogen atoms substituted by hydroxy groups, or $R^6$, $R^7$ and the nitrogen atom may form a piperidino group or a pyrrolidinyl group, or $R^6$, $R^7$, the oxygen atom and the nitrogen atom may form a morpholino group.

3. The antifouling composition according to claim 1, wherein the fluorocopolymer contains from 1 to 5 mass % of polymerized units (d) based on the following monomer (d):

monomer (d): a monomer which is copolymerizable with the above monomers (a), (b1) and (b2) and which has at least one crosslinkable functional group selected from the group consisting of an isocyanate group, a blocked isocyanate group, an urethane bond, an alkoxysilyl group, an epoxy group, an N-methylol group and an N-alkoxymethyl group, and has no polyfluoroalkyl group.

4. The antifouling composition according to claim 2, which contains the fluorocopolymer containing the polymerized units (c) and an aqueous medium, wherein the content of a volatile organic solvent is at most 1 mass %.

5. The antifouling composition according to claim 3, wherein the monomer (d) is a compound having a blocked isocyanate group.

6. The antifouling composition according to claim 1, wherein in $(Z-Y)_nX$ representing the monomer (a), Z is a $C_{1-6}$ perfluoroalkyl group, Y is a bivalent organic group, and n is 1 and X is —OCOCR=$CH_2$, or n is 2 and X is —OCOCH=CHCOO— wherein R is a hydrogen atom, a methyl group or a halogen atom.

7. The antifouling composition according to claim 6, wherein the monomer (a) is $F(CF_2)_sY^1$—OCOCR=$CH_2$ wherein s is an integer of from 1 to 6, R is a hydrogen atom, a methyl group or a halogen atom, and $Y^1$ is a $C_{1-10}$ alkylene group.

8. An article treated with the antifouling composition as defined in claim 1.

9. The antifouling composition according to claim 1, wherein in monomer (b2) $R^3$ is a methyl group.

10. The antifouling composition according to claim 1, wherein in monomer (b2) $R^4$ is a hydrogen atom.

11. The antifouling composition according to claim 1, wherein in monomer (b2) q2 and/or q3 is an integer from 2 to 20.

12. The antifouling composition according to claim 1, wherein monomer (b2) is at least one monomer selected from the group consisting of poly(ethylene oxide-tetramethylene oxide) monoacrylate ($CH_2$=CHCOO-[$(EO)_{q2}$-$(TO)_{q3}$]—H), poly(ethylene oxide-tetramethylene oxide) monomethacrylate ($CH_2$=C($CH_3$)COO-[$(EO)_{q2}$-$(TO)_{q3}$]—H), methoxypoly(ethylene oxide-tetramethylene oxide) monoacrylate ($CH_2$=CHCOO-[$(EO)_{q2}$-$(TO)_{q3}$]—$CH_3$), methoxypoly(ethylene oxide-tetramethylene oxide) monomethacrylate ($CH_2$=C($CH_3$)COO-[$(EO)_{q2}$-$(TO)_{q3}$]—$CH_3$).

13. A method for producing an antifouling composition, which comprises polymerizing a monomer mixture comprising from 30 to 65 mass % of the following monomer (a), from 1 to 67 mass % of the following monomer (b1) and from 3 to 34 mass % of the following monomer (b2), wherein the content of —$(C_2H_4O)$— is from 20 to 65 mass %, and the content of —$(C_4H_8O)$— is from 2 to 13 mass %, in the presence of a polymerization initiator in a medium:

monomer (a): a compound represented by $(Z-Y)_nX$, wherein Z is a $C_{1-6}$ perfluoroalkyl group or a monovalent group represented by $C_mF_{2m+1}O(CFWCF_2O)_dCFK$— wherein m is an integer of from 1 to 6, d is an integer of from 0 to 4, and each of W and K which are independent of each other, is a fluorine atom or a trifluoromethyl group, Y is a bivalent organic group or a single bond, n is 1 or 2, when n is 1, X is —CR=$CH_2$, —COOCR=$CH_2$, —OCOCR=$CH_2$, —OCH$_2$-φ-CR=$CH_2$ or —OCH=$CH_2$, and when n is 2, X is —CH[—$(CH_2)_p$CR=$CH_2$]—, —CH[—$(CH_2)_p$COOCR=$CH_2$]—, —CH[—$CH_2)_p$OCOCR=$CH_2$]— or —OCOCH=CHCOO—, R is a hydrogen atom, a methyl group or a halogen atom, φ is a phenylene group, and p is an integer of from 0 to 4, monomer (b1): a compound represented by $CH_2$=$CR^1$-$G^1$-$(C_2H4O)_{q1}$—$R^2$, monomer (b2): a compound represented by $CH_2$=$CR^3$-$G^2$-$(C_2H_4O)_{q2}$—$(C_4H_8O)_{q3}$—$R^4$, wherein each of $R^1$, $R^2$, $R^3$ and $R^4$ which are independent of one another, is a hydrogen atom or a methyl group, each of q1 and q3 which are independent of each other, is an integer of from 1 to 50, q2 is an integer of from 1 to 50, each of $G^1$ and $G^2$ which are independent of each other, is —COO$(CH_2)_r$— or —COO$(CH_2)_t$—NHCOO— wherein r is an integer of from 0 to 4, and t is an integer of from 1 to 4.

14. The method for producing an antifouling composition according to claim 13, wherein the monomer mixture contains from 2 to 10 mass % of the following monomer (c):

monomer (c): a compound represented by $CH_2$=$CR^5$-M-Q-$NR^6R^7$ or $CH_2$=$CR^5$-M-Q-N(O)$R^6R^7$, wherein $R^5$ is a hydrogen atom or a methyl group, M is —COO— or —CONH—, Q is a $C_{2-4}$ alkylene group or a $C_{2-3}$ alkylene group having some or all of hydrogen atoms substituted by hydroxy groups, each of $R^6$ and $R^7$ which are independent of each other, is a benzyl group, a $C_{1-8}$ alkyl group or a $C_{2-3}$ alkyl group having some of hydrogen atoms substituted by hydroxy groups, or $R^6$, $R^7$ and the nitrogen atom may form a piperidino group or a pyrrolidinyl group, or $R^6$, $R^7$, the oxygen atom and the nitrogen atom may form a morpholino group.

15. The method for producing an antifouling composition according to claim 13, wherein the monomer mixture contains from 1 to 5 mass % of the following monomer (d):

monomer (d): a monomer which is copolymerizable with the above monomers (a), (b1) and (b2) and which has at least one crosslinkable functional group selected from the group consisting of an isocyanate group, a blocked isocyanate group, an urethane bond, an alkoxysilyl group, an epoxy group, an N-methylol group and an N-alkoxymethyl group, and has no polyfluoroalkyl group.

16. The method for producing an antifouling composition according to claim 13, wherein in monomer (b2) $R^3$ is a methyl group.

17. The method for producing an antifouling composition according to claim 13, wherein in monomer (b2) $R^4$ is a hydrogen atom.

18. The method for producing an antifouling composition according to claim 13, wherein in monomer (b2) q2 and/or q3 is an integer from 2 to 20.

19. The method for producing an antifouling composition according to claim 13, wherein monomer (b2) is at least one monomer selected from the group consisting of poly(ethylene oxide-tetramethylene oxide) monoacrylate ($CH_2$=CHCOO-[$(EO)_{q2}$-$(TO)_{q3}$]—H), poly(ethylene oxide-tetramethylene oxide) monomethacrylate ($CH_2$=C($CH_3$)COO-[$(EO)_{q2}$-$(TO)_{q3}$]—H), methoxypoly(ethylene oxide-tetramethylene oxide) monomethacrylate ($CH_2$=C($CH_3$)COO-[$(EO)_{q2}$-$(TO)_{q3}$]—$CH_3$).

* * * * *